(12) United States Patent
Heidloff et al.

(10) Patent No.: US 7,323,999 B2
(45) Date of Patent: Jan. 29, 2008

(54) AUTOMATIC SUBSCRIPTIONS TO SHARED REPOSITORIES WITH NOTIFICATIONS REFLECTING ACCESSES BY IMPORTANT OTHER USERS AND KEYWORDS STORED IN A PERSONAL INTEREST PROFILE

(75) Inventors: Niklas Heidloff, Salzkotten (DE); Michael R. O'Brien, Westford, MA (US); Carl J. Kraenzel, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 11/078,828

(22) Filed: Mar. 11, 2005

(65) Prior Publication Data
US 2006/0212427 A1    Sep. 21, 2006

(51) Int. Cl.
*G08B 23/00* (2006.01)
(52) U.S. Cl. ...................... 340/573.1; 725/46
(58) Field of Classification Search ............. 340/573.1; 705/7; 707/8, 9; 709/229; 725/44, 45, 46
See application file for complete search history.

(56) References Cited

U.S. PATENT DOCUMENTS

| | | | |
|---|---|---|---|
| 5,898,836 A | 4/1999 | Freivald et al. | |
| 6,400,810 B1 | 6/2002 | Skladman et al. | |
| 6,434,747 B1 * | 8/2002 | Khoo et al. | 725/46 |
| 6,519,571 B1 * | 2/2003 | Guheen et al. | 705/14 |
| 6,769,010 B1 * | 7/2004 | Knapp et al. | 709/203 |
| 6,950,804 B2 * | 9/2005 | Strietzel | 705/26 |
| 6,988,126 B2 * | 1/2006 | Wilcock et al. | 709/204 |
| 7,076,736 B2 * | 7/2006 | Hugh | 715/743 |
| 7,117,516 B2 * | 10/2006 | Khoo et al. | 725/46 |
| 7,130,807 B1 * | 10/2006 | Mikurak | 705/7 |

* cited by examiner

*Primary Examiner*—John Tweel, Jr.
(74) *Attorney, Agent, or Firm*—McGuinness & Manaras LLP

(57) ABSTRACT

A system and method for automatically generating and receiving notifications regarding accesses to documents in a shared repository, where the notifications are filtered such that they are only generated and/or received for accesses that match a personal interest profile of a local user. The personal interest profile of the local user includes a number of keywords determined to be of interest to the local user, as well as a number of important person identifiers associated with other users determined to be important to the local user. The system is operable to provide notifications in response to accesses by important other users to shared documents, including reading of those documents by the important other users.

16 Claims, 2 Drawing Sheets

AUTOMATIC SUBSCRIPTIONS TO SHARED REPOSITORIES WITH NOTIFICATIONS REFLECTING ACCESSES BY IMPORTANT OTHER USERS AND KEYWORDS STORED IN A PERSONAL INTEREST PROFILE

FIELD OF THE INVENTION

The present invention relates generally to sharing data among computer system users, and more specifically to a system and method for automatic subscriptions to documents created in shared repositories with a user specific filter.

BACKGROUND OF THE INVENTION

As it is generally known, various computer software systems have been developed that allow users to share information and discuss topics. These applications have sometimes been referred to as "teamspaces". For example, Lotus® Notes includes constructs such as teamrooms, Quickplaces, and other server side databases. Lotus Workplace also includes document libraries and discussions in Workplace Teamspaces. Other examples include discussion forums on the Internet, etc.

Since many users spend most of their time in their email application, they often don't see changes in shared repositories, or they see changes too late for them to be useful. For example, if a user adds a question to an online help desk discussion, they may not frequently visit the discussion to check whether someone has responded.

The concept of subscriptions allows users to be notified when something changes in a shared repository. An example of a subscription approach is found in Lotus Notes, which allows users to add subscriptions manually in order to receive certain change notifications. A potential problem may arise, however, if users do not use the subscription feature, because they don't want to, or don't have time to manually enter change subscriptions. Sometimes users are not even aware of the feature's existence. Manual subscription features may also result in a user subscribing to too many changes, causing them to receive too many email notifications, resulting in their inbox being flooded.

There are also existing systems that provide automatic subscriptions. These systems operate such that when a document is created, added or modified within a teamspace, or when a response is added, notifications are automatically sent. However, these existing systems may also cause an email flood to a user's inbox by generating a large number of notifications. Notifications may be sent when responses are added by other users that are not even known to the receiver of the notifications. Moreover, existing automatic subscription systems do not provide notification filtering or generation based on keywords. As a result, the receiving user may have no or limited interest in many notifications they are sent. Finally, existing systems include no mechanism for providing notifications regarding documents that have been accessed or read by persons that are important to a user, even though such documents may not have been created or modified by the important person.

SUMMARY OF THE INVENTION

To address the above described and other shortcomings of the prior art, a system and method are disclosed for automatically generating and receiving notifications regarding accesses to documents in a shared repository, where the notifications are filtered such that they are only generated and/or received for accesses that match a personal interest profile of a local user. The personal interest profile of the local user includes a number of keywords determined to be of interest to the local user, as well as a number of important person identifiers associated with other users determined to be important to the local user. The disclosed system is operable to provide notifications in response to accesses by important other users to shared documents, including reading of those documents by the important other users.

The personal interest profile may be automatically determined and dynamically maintained for the local user. The personal interest profile may automatically determine identifiers of other users that are important to the local user based on some predetermined criteria. For example, users that have recently and/or frequently communicated with the local user may be considered to be important other users, and their identifiers may be automatically stored in the local user's personal interest profile in response to monitoring of a communications application on the local computer system. Similarly, such important other users may be automatically determined from the contents of a contact list, address book, or other database within such a communications application. The keywords stored in the personal interest profile may be automatically determined based on monitoring the contents of communications with the local user through a communications application, such as email messages, instant messages, etc. For example, such keywords may be determined based on the frequency of occurrence of words or phrases contained in recent email messages, instant messages, or other types of communications. Similarly, the keywords in the personal interest profile may be automatically determined in response to the words or phrases contained in predetermined portions of messages, such as the subject line of email messages communicated with the local user.

The disclosed system advantageously provides notifications in response to accesses to shared documents, including read operations. Accordingly, in the event that an important other user reads a document in a monitored shared content source, the disclosed system will send a notification to the local user indicating that such a read operation has occurred. Thus the local user is kept informed regarding what documents in the shared repositories are being read by important persons indicated in the personal interest profile. Notifications regarding reads of documents by important persons may be filtered with regard to keywords within the personal interest profile, such that notifications regarding reads by important other persons are only provided with respect to reads of documents that include such keywords.

The disclosed system recognizes that if another user makes a modification to a discussion thread in a shared repository, and the local user has never communicated with that user, that change is often not as important to the local user as a change made by a user determined to be important to the local user. For example, a user may add a document to an Internet discussion forum in order to share some information, but may not need or want an answer. In such circumstances, the user does not want to be disturbed or potentially even flooded by email notifications about changes related to the discussion thread containing the document. However, if another user that is relatively important to the local user, such as their manager, responds to the posting, the local user may want to receive a notification about such a response.

Embodiments of the disclosed system may further allow notifications for some shared content sources, for all changes made, independent of the personal interest profile.

Such embodiments may optionally provide personal interest profile filtering, for example by prompting the local user when they create or add a document or thread to determine whether they want to receive all notifications, or only notifications reflecting the personal interest profile of the local user.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
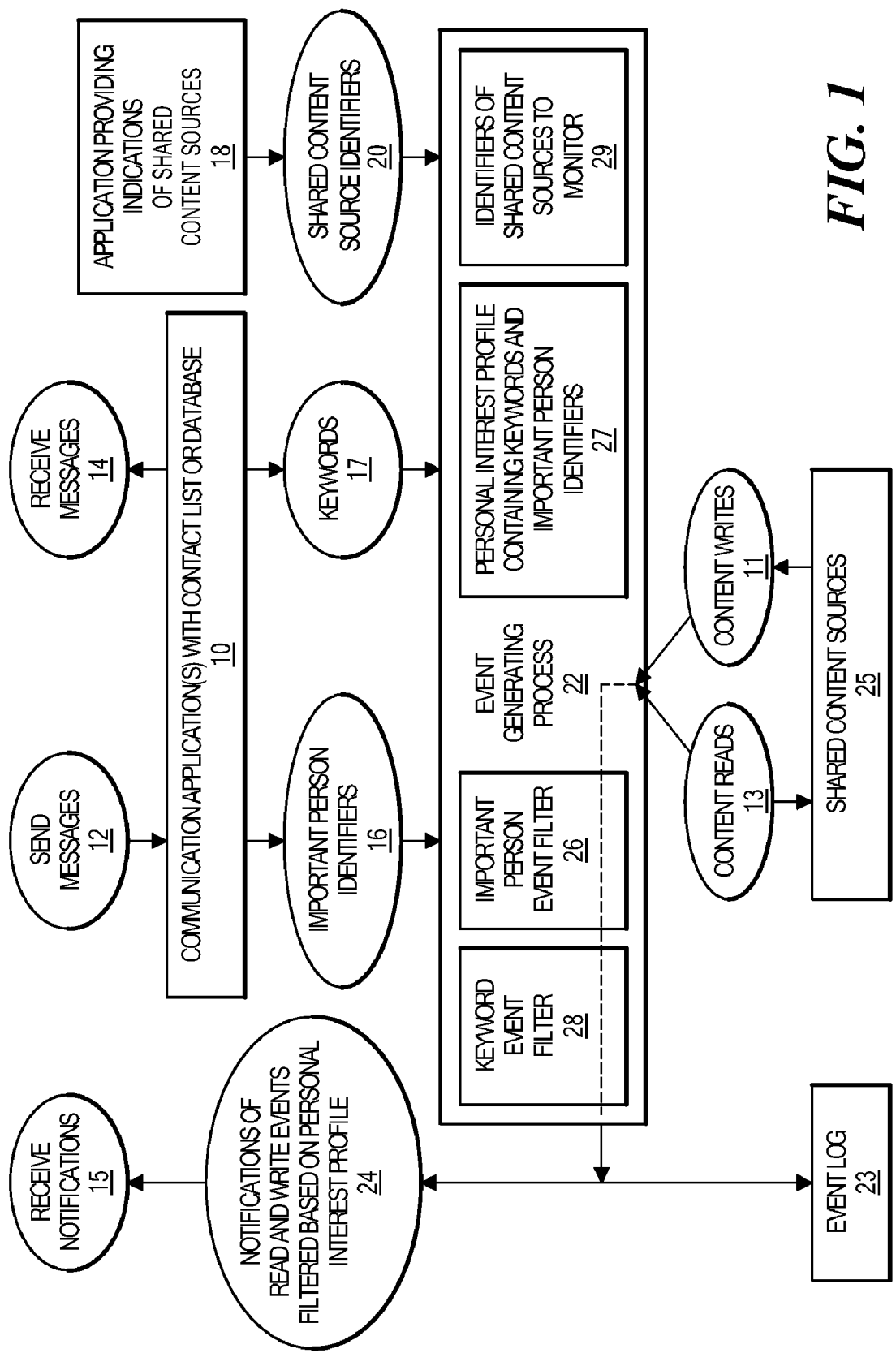
FIG. 1 is a block diagram of components in an illustrative embodiment of the disclosed system.

As shown in FIG. 1, an illustrative embodiment of the disclosed system includes a number of communication applications 10 having a contact list or database, an event generating process 22 with a personal interest profile containing keywords and important person identifiers, and further maintaining identifiers of shared content sources to monitor 29, and an application 18 providing identifiers 20 of shared content sources. During operation of the embodiment shown in FIG. 1, a user sends messages 12 and receives messages 14 through the communication application 10. The personal interest profile 27 may, for example, be generated and maintained based on the user's use of the communication application 10. For example, the keywords 17 that are passed to the event generating process 22 for storage in the personal interest profile 27 may be determined based on the contents of messages sent from and/or received by the user through the communication application 10.

They keywords 17 may be determined based on some predetermined criteria. For example, the keywords may consist of only those words or phrases occurring most frequently within messages communicated through the communication application 10, or those words or phrases occurring most recently within such messages. The important person identifiers 16 passed to the event generating process 22 for storage in the personal interest profile 27 may consist of other users to whom messages are sent, or from whom messages are received, through the communication application 10. Alternatively, or in addition, the keywords 17 may be read from some predetermined portion of messages communicated through the communication application 10. Such a predetermined message portion may, for example, consist of a subject line in electronic mail messages, or any other message field. The keywords stored in the personal interest profile 27 may consist of words, phrases, topics, or other specific types strings of text or characters.

The important person identifiers 16 may, for example, be read from an address book, contact list, or similar construct associated with the communication application 10, and passed to the event generating process 22 for storage in the personal interest profile 27. The important person identifiers 16 may alternatively or additionally be determined based on the destination and source fields of messages sent and received by the communication application 10. Such important person identifiers 16 may reflect all persons that the user has communicated with using the communication application 10, or consist only of some number or percentage of those persons with which the user most frequently communicates using the communication application 10. The important person identifiers stored in the personal interest profile 27 may consist of any specific type of user identifiers, such as user names, electronic mail addresses, instant messaging screen names, or the like. The communication application 10 may consist of an electronic mail, instant messaging, or other specific type of communication application.

The collection of the important person identifiers 16 and keywords 17 by the event generating process 22 from the communication application 10 occurs automatically, without requiring the user to subscribe, register, or perform any other kind of explicit request for notifications.

The application program 18 from which the important content sources 20 are collected may consist of any application through which the user accesses content sources, such as an Internet Browser program or the like, or a system administration or management program that allows a system administrator to indicate which content sources are interesting to, and accessible by a given user. The important content source identifiers 20 may consist of any appropriate content source identifier for a given embodiment. Examples of important content source identifiers 20 include links to Web pages, file names and/or directory paths to files or documents stored on local or networked storage devices. The important content source identifiers 20 refer to content stored in the shared content sources 25, which may include any specific type of shared information repository. The important content source identifiers 20 may indicate files or documents to which accessibility is defined by associated access control lists (ACLs), or other access control mechanism. In such an embodiment, a system administrator may define both the important content sources identifiers 20 for a given user, as well as define the users for which access is provided to each document, file, content source, or other unit of content. Such controls may be provided to a system administrator, for example, through the application 18.

During operation of the embodiment shown in FIG. 1, the event generating process 22 monitors actions performed on the shared content sources 25, such as read, modify, delete, or add operations. As shown for purposes of illustration in FIG. 1, actions such as reads 13 and writes 11 are detected by the event generating process 22. The reads 13 and writes 11 may be passed first through an important person event filter 26, which prevents notifications from being generated unless the actions are performed by an important person indicated by the personal interest profile 27. Next, the filtered actions may be passed through the keyword event filter 28, which prevents notifications from being generated unless the actions are performed on a document containing or associated with one of the keywords in the personal interest profile 27.

As a result of applying the important person event filter 26 and the keyword event filter 28, only actions performed by one of the important persons indicated by the important person identifiers 16 on content in the shared content sources 25 that indicated by one of the important content source identifiers 20, and containing at least one of the keywords stored in the personal interest profile 27, result in an event notification 24 being generated. The event notification 24 may include an indication of the specific content that was subject to the detected action, such as a Web page, file or document identifier. The event notification 24 may further include an indication of the important person that performed the action, such as the important person identifier associated with that person, and/or an indication or highlighting of the keyword(s) contained in the content. The shared content sources 25 may consist of any specific kind of document repository that is shared by multiple users.

Event notification 24 may, for example, be received 15 by the user through the communication application 10, or alternatively through some other mechanism. Accordingly, the event notification 24 may be passed from the event generating process 22 directly to the user, or to the user through the communication application 10. The user may receive the event notification 24 through their normal message receiving path provided through the communication application 10, such as the inbox of an electronic mail application program, instant messaging session, or the like.

An indication or copy of the event notification 24 may also be stored in an event log 23, providing a record of which notifications have previously been sent to the user, and at what time such notifications were sent. Based on the content of the event log 23, the event generating process 22 may operate to limit the number of times a notification is provided with regard to a given item of content. The event generating process may operate to provide event notifications regarding actions performed on a specific content item once per pre-determined or user-configured time period, such as once per day.

Figure 2:
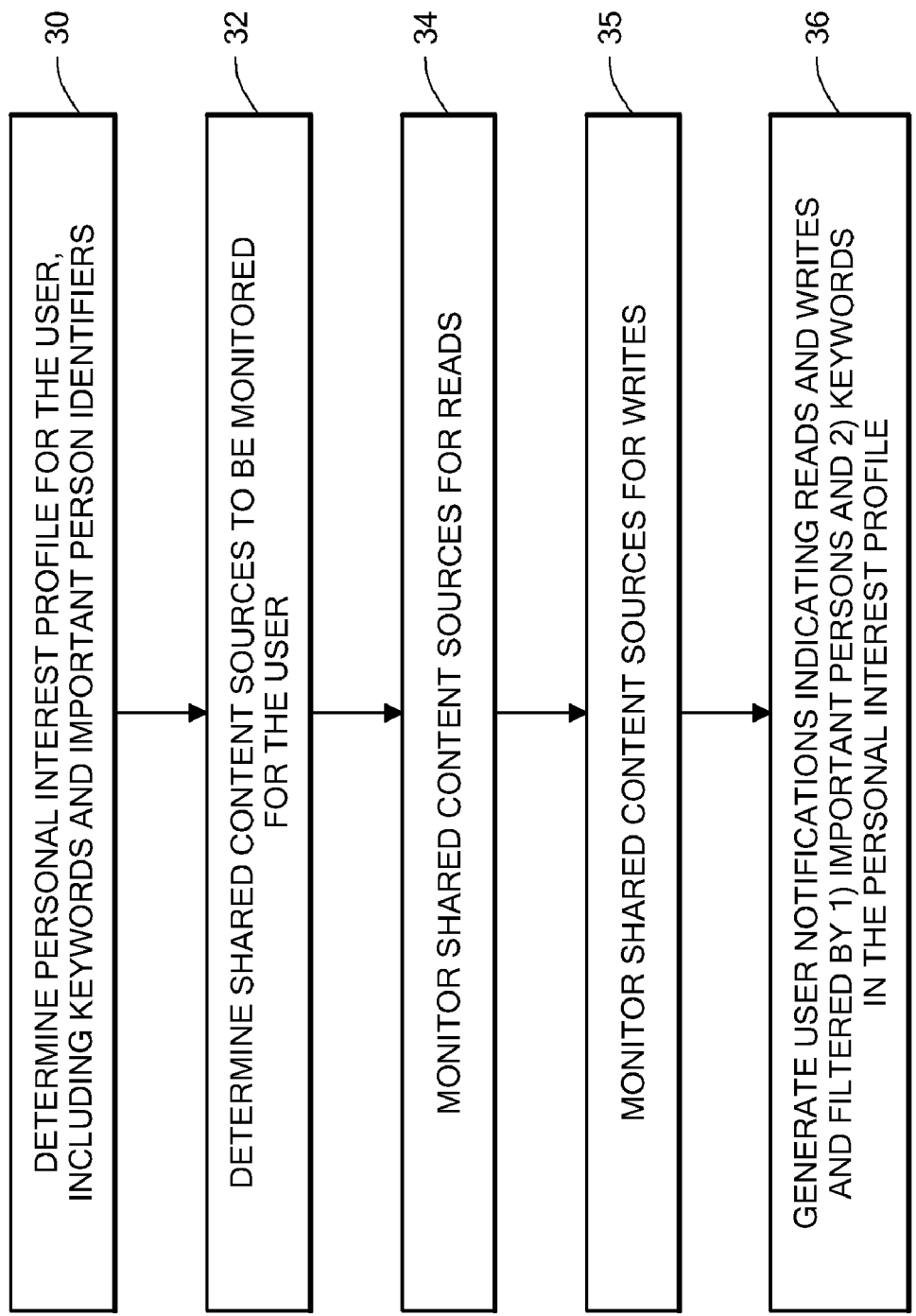
FIG. 2 is a flow chart showing steps performed during operation of an illustrative embodiment of the disclosed system.

FIG. 2 is a flow chart illustrating steps performed in an illustrative embodiment of the disclosed system. At step 30, a personal interest profile is determined for a given user. The personal interest profile determined at step 30 includes keywords consisting of words or phrases that are important to the user, as well as identifiers of other users that are important persons the user. The determination at step 30 may be performed automatically based on actions of the user, such as monitoring of communications between the user and other persons through a communication program. Alternatively, the determination at step 30 may be in response to indications of keywords and/or important persons provided by the user, expressly for purposes of generating event notifications.

At step 32, important shared content sources for the user are determined. The important shared content sources may be determined automatically, based on monitoring of user actions with regard to accessing shared data repositories. The important shared content sources may include shared data repositories that are accessed by the user, or that are accessed relatively more frequently by the user than other shared data repositories. Alternatively, the important shared content sources determined at step 32 may be provided expressly for a given user by the user, or by a system administrator through a graphical user interface or the like. At step 34, the disclosed system monitors important shared content sources for reads, and at step 35 the disclosed system monitors important shared content sources for writes. While the steps 34 and 35 are shown in sequential order for purposes of illustration in FIG. 2, those skilled in the art will recognize that these two steps may be performed in parallel, or in reverse order with respect to the order shown in FIG. 2. Moreover, the writes monitored in step 34 may further include add, modify, or delete operations.

In response to detection of actions on the shared content sources detected at steps 34 and 35, user notifications indicating those actions are provided to the user at step 36. For example, at step 36, user notifications may be initially filtered by an important person filter, such that notifications are only generated for reads or writes performed by important persons identified in the personal interest profile of the user. Subsequently, a keyword filter may be applied to prevent notifications from being generated except with respect to actions performed on shared content containing or associated with one or more keywords in the user's personal interest profile.

While the previous discussion describes application of an important user filter prior to a keyword filter for purposes of explanation, other embodiments are possible. In such alternative embodiments, keyword and important person filtering of event notifications may be partly or completely performed in some other specific order, as appropriate for a specific implementation. Similarly, the steps of FIG. 2 are not limited to the specific order shown in the figure, and may also be partly or completely performed in other orders, as may be appropriate under specific circumstances.

The disclosed system advantageously enables a user to spend large amounts of time in a communication application program, without having to explicitly check shared content files or documents for changes, and still conveniently maintain an awareness of when important documents within such shared content is accessed. In this way, the disclosed system enables a communications program to function as a personal "portal" to a variety of applications and/or on-line activities. There is no need for a user to be aware of how the system works, to expressly subscribe to notifications, or expressly define either the keywords, important users, or important content sources on which to base the generated event notifications. The disclosed system can further conveniently identify the important person that performed the action on the important content in the notification provided to the user, and/or indicate the keyword(s) associated with that content, thus enabling the user to better determine how urgently they should review the shared content. This information may additionally be combined in the event notification with the identifier of the important content that has been changed.

The disclosed system may thus provide event notifications based on the automatically generated personal interest profile, reflecting use of one or more communication applications. The set of important content sources can also be determined automatically, for example by reading the bookmarks in a user's Internet Browser program, without explicit user interaction. The event generating process of the disclosed system may be implemented centrally within a shared database, using programming "hooks" provided in the database to allow future expansion. For example, in a shared repository consisting of an on-line discussion database, each time someone in the discussion modifies, adds or deletes a document in the discussion database, a determination would be made by the event generating process to determine which users are to be provided with event notifications, based on the important person and important content source information maintained for each member of the on-line discussion. Alternatively, the event generating and/or filtering provided by the disclosed system based on a personal interest profile may be performed on the relevant user's system. In such an alternative embodiment, the information regarding important persons, keywords, and important content sources may be collected and stored locally on the user's computer system, and may be used to generate event notifications locally on the user's system, or to filter events received from a central event notification generator.

In a use case example of an embodiment of the disclosed system, a user P1 might be a technical lead in a development team for a project with name "Zebra". Another person P2 on the team might need to know about specifications that P1 defines relating to project Zebra. There may further be a shared repository S in which information, including specifications, are stored regarding a number of projects, including project Zebra. If P1 adds a new Zebra specification to S, then P2 wants to know. However, P2 does not want to be notified when other people add documents to S, or when P1 adds a document unrelated to Zebra. An embodiment of the disclosed system may use an interest profile associated with P2, in which P1 would be listed as an important person, and Zebra would be listed as a keyword. In addition, P2 has accessed S, which provides an indication that the source S is of special interest to him. As a result, whenever P1 adds a document to S that contains the term "Zebra", P2 is notified, for example by email, SIP (Session Initiation Protocol) message, or other type of message, that there is a new Zebra document in S.

The above described embodiments may be modified in various ways. For example, a mixture of automatically determined and manual inputs may be used to obtain the keywords and/or important persons and/or important sources for a user. The system may be implemented such that users can manually define the keywords or persons that are important for their daily work, and manually add links to important content sources, while indications of such important persons and important content sources are also being 'calculated' automatically. Moreover, a variety of specific approaches may be used to automatically determining keywords or important persons based on the user's use of a communication application. These approaches include determinations based on frequency of communications between the user and other persons, how recently the user has communicated with other users, and other specific techniques.

Similarly, various specific techniques can be used by the disclosed system to avoid redundant notifications based on the above described notification log. The notification log may itself be used to store, and periodically obtain and send notifications regarding individual documents, for example only once a day. Alternatively, rather than sending one notification for each changed document, or for each document change, a software agent may be used to run on a scheduled basis (e.g. every night) to generate one notification for the user, including a list of links to document changes in shared sources.

FIGS. 1 and 2 are block diagram and flowchart illustration of methods, apparatus(s) and computer program products according to an embodiment of the invention. It will be understood that each block of FIGS. 1 and 2, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the may be embodied using a variety of specific command structures.

We claim:

1. A method for automatically providing notifications to a user regarding interesting content, comprising:
   determining a personal interest profile for said user, wherein said personal interest profile includes at least one important person for said user and at least one keyword;
   determining at least one important shared content source for said user;
   monitoring said important shared content source for at least one action performed by said important person on at least one document within said important shared content source, wherein said at least one document includes said at least one keyword; and
   in the event that said important person performs said at least one action on said document including said at least one keyword, generating a notification to said user.

2. The method of claim 1, wherein said at least one action on said document comprises said important person accessing said document by reading said document.

3. The method of claim 1, wherein said determining said personal interest profile comprises determining said at least one keyword in response to monitoring communications with said user through a communication application.

4. The method of claim 2, wherein said communications application comprises an electronic mail application.

5. The method of claim 2, wherein said communication application comprises an instant messaging application.

6. The method of claim 3, wherein said determining said personal interest profile comprises determining said at least one important person for said user by determining said at least one important person through a communication application, wherein said at least one important person comprises another user that has communicated with the user through said communication application.

7. The method of claim 1, wherein said notification to said user comprises an electronic mail message.

8. A system for automatically providing notifications to a user regarding interesting shared content based on a personal interest profile associated with the user, said system including a computer readable medium, said computer readable medium having a computer program stored thereon, said computer program comprising:

program code for determining a personal interest profile for said user, wherein said personal interest profile includes at least one important person for said user and at least one keyword;

program code for determining at least one important shared content source for said user;

program code for monitoring said important shared content source for at least one action performed by said important person on at least one document within said important shared content source, wherein said at least one document includes said at least one keyword; and program code for, in the event that said important person performs said at least one action on said document including said at least one keyword, generating a notification to said user.

9. The system of claim 8, wherein said at least one action on said document comprises said important person accessing said document by reading said document.

10. The system of claim 8, wherein said program code for determining said personal interest profile comprises program code for determining said at least one keyword in response to monitoring communications with said user through a communication application.

11. The system of claim 9, wherein said communications application comprises an electronic mail application.

12. The system of claim 9, wherein said communication application comprises an instant messaging application.

13. The system of claim 10, wherein said program code for determining said personal interest profile comprises program code for determining said at least one important person for said user by determining said at least one important person through a communication application, wherein said at least one important person comprises another user that has communicated with the user through said communication application.

14. The system of claim 8, wherein said notification to said user comprises an electronic mail message.

15. A computer program product having a computer readable medium, said computer readable medium having a computer program for automatically providing notifications to a user regarding interesting shared content based on a personal interest profile associated with the user stored thereon, said computer program comprising:

program code for determining a personal interest profile for said user, wherein said personal interest profile includes at least one important person for said user and at least one keyword;

program code for determining at least one important shared content source for said user;

program code for monitoring said important shared content source for at least one action performed by said important person on at least one document within said important shared content source, wherein said at least one document includes said at least one keyword; and program code for, in the event that said important person performs said at least one action on said document including said at least one keyword, generating a notification to said user.

16. A system for automatically providing notifications to a user regarding interesting shared content based on a personal interest profile associated with the user, comprising:

means for determining a personal interest profile for said user, wherein said personal interest profile includes at least one important person for said user and at least one keyword;

means for determining at least one important shared content source for said user;

means for monitoring said important shared content source for at least one action performed by said important person on at least one document within said important shared content source, wherein said at least one document includes said at least one keyword; and means for, in the event that said important person performs said at least one action on said document including said at least one keyword, generating a notification to said user.

* * * * *